(12) United States Patent
Schafer et al.

(10) Patent No.: US 6,390,666 B1
(45) Date of Patent: May 21, 2002

(54) PACKING GLAND SEAL ASSEMBLY AS AN UPSTREAM SEAL FOR MIXER ROTORS

(75) Inventors: Harold L. Schafer, Lehighton; Kelly Ziegenfus, Jim Thorpe; Donald Woodring, Tamaqua, all of PA (US)

(73) Assignee: Tech, Process & Engineering, Inc., Lehighton, PA (US)

( * ) Notice: Subject to any disclaimer, the term of this patent is extended or adjusted under 35 U.S.C. 154(b) by 0 days.

(21) Appl. No.: 09/707,208

(22) Filed: Nov. 7, 2000

(51) Int. Cl.$^7$ .............................. B01F 7/08; B01F 15/00
(52) U.S. Cl. ........................ 366/331; 277/527; 277/534; 277/541
(58) Field of Search ............................... 366/64–67, 79, 366/83–85, 318, 331, 608; 416/174; 277/510, 511, 520, 529, 527, 530, 536, 537, 541, 534

(56) References Cited

U.S. PATENT DOCUMENTS

| | | | |
|---|---|---|---|
| 2,723,110 A | * | 11/1955 | Collins |
| 2,805,874 A | * | 9/1957 | Plumb |
| 2,961,224 A | * | 11/1960 | Wright |
| 3,199,795 A | * | 8/1965 | Bennett et al. |
| 3,730,491 A | * | 5/1973 | Kuster |
| 3,963,247 A | | 6/1976 | Nommensen |
| 4,106,778 A | * | 8/1978 | Cormack et al. |
| 4,199,153 A | * | 4/1980 | Martin |
| 4,291,888 A | * | 9/1981 | Tanaka et al. |
| 4,419,015 A | * | 12/1983 | Liddiard |
| 4,521,026 A | * | 6/1985 | Eide |
| 4,556,222 A | * | 12/1985 | Lewis et al. |
| 4,850,723 A | * | 7/1989 | Whiteman, Jr. |
| 4,878,677 A | * | 11/1989 | Larkins et al. |
| 5,261,740 A | | 11/1993 | Mosher et al. |
| 5,277,489 A | * | 1/1994 | Hamm |
| 5,368,390 A | * | 11/1994 | Gambrill et al. |
| 5,382,089 A | | 1/1995 | Mosher |
| 5,526,566 A | | 6/1996 | Mosher |
| 5,735,603 A | * | 4/1998 | Kesig et al. |
| 6,270,247 B1 | * | 8/2001 | Tschopp |

FOREIGN PATENT DOCUMENTS

| | | | | |
|---|---|---|---|---|
| GB | 1526936 | * | 10/1978 | ............. 277/511 |
| JP | 60-44031 | * | 3/1985 | ............. 366/331 |
| JP | 63-16975 | * | 4/1988 | ............. 366/331 |

* cited by examiner

*Primary Examiner*—Charles E. Cooley
(74) *Attorney, Agent, or Firm*—A. R. Eglington

(57) ABSTRACT

In the field of helical bladed rotors, and their sealing assemblies an improved upstream seal for mixer rotors is provided. It includes a bushing-like visco sleeve subassembly, a sleeve shaped metallic liner positioned abutting the visco sleeve; a sleeve-like, visco seal having first and second peripheries, an L-shaped packing seat retainer, all configured to provide a single annular shaped inner chamber in which a single, rope-like packing component serves to minimize hardening of the packing assembly by minimizing feed particulate material leaking into the upstream visco seal.

7 Claims, 5 Drawing Sheets

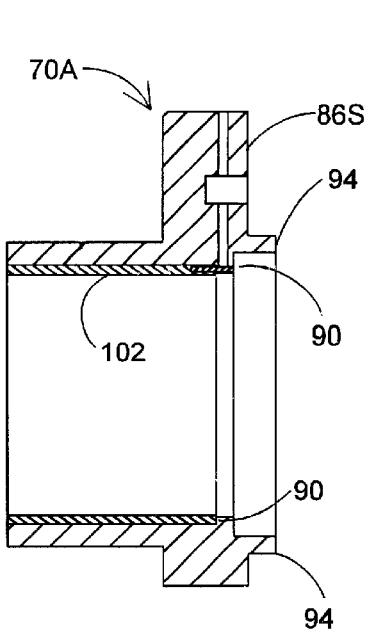 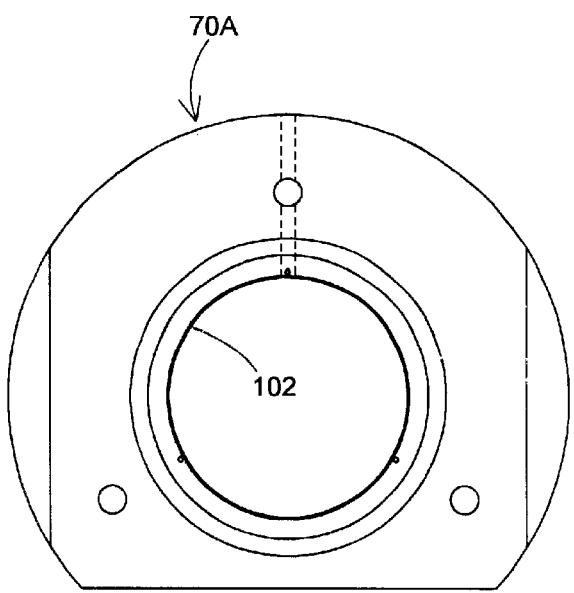
FIG. 5A  FIG. 5B
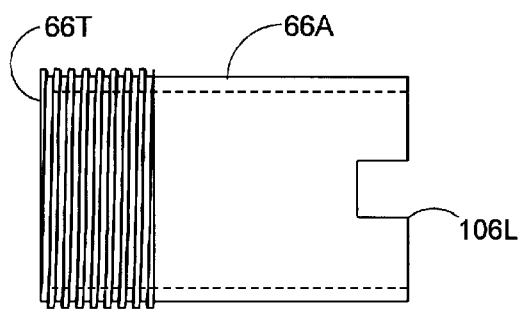 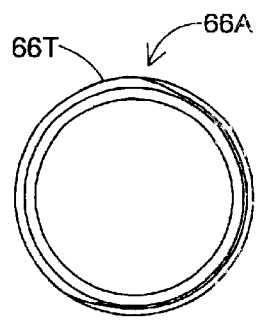
FIG. 6A  FIG. 6B
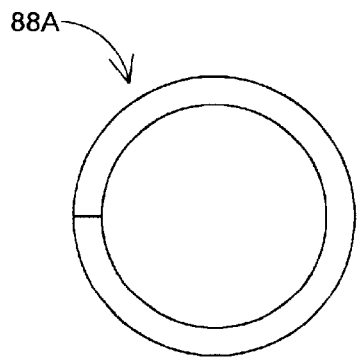 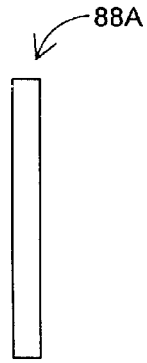
FIG. 7A  FIG. 7B

PACKING GLAND SEAL ASSEMBLY AS AN UPSTREAM SEAL FOR MIXER ROTORS

This is an examinable patent application under Section 111(a) submitted for a formal filing receipt.

1. Field of the Invention

The present invention lies in the field of helical bladed, rotors and their sealing assemblies on the drive end of the rotors serving as continuous mixers for plastic materials.

2. Background of the Invention

The present invention relates to the operating problems encountered with sealing arrangements for a rotatable shaft, like a helical rotor. During rotor turning, a sealing pressure is built up and maintained in the molten materials as enclosed within the annular clearances provided between the rotors and the surrounding barrel by means of the helical ridges moving within the mixer. The current practice for a drive end journal, or rotor pilot component, requires a packing gland seal means to effect a compression on the packing component itself, so that its seals against an outer wear sleeve. The currently accepted sealing means is effective for only a relatively short time. This occurs because the particulate feed materials, and in their thermoplastic forms, work their way into the seal assembly itself. This then serves to harden the packing component, eventually to the extent that it appreciably stiffens, and the packing will no longer seat tightly against the wear sleeve. The positive air pressure in the mixer will cause the leaking of particulates to flow through the impaired sealing means, creating mixer site contamination, impacting worker cleanliness, and risking operating safety.

Accordingly, it is a principal object of the invention to provide a visco sealing means in which particulate and molten materials do not bleed through the sealing means so as to generate site contamination.

It is another object to maintain the required sealing pressure at desired speeds of helical rotor rotation.

Yet another object of the invention is to eliminate any air pressure leakage from the mixing cylinder upon startup until the working area is loaded with molten material and/or particularly feed.

A still further object of the invention is to reduce seal area wear and packing seals degeneration so as to extend the operational range for a given sealing means assembly.

SUMMARY OF THE INVENTION

According to the invention, there is now provided a continuous mixer apparatus adapted for commingling of particulate thermoplastic materials of varying polymeric compositions, and having a mixer barrel, at least one main rotor with a helical profile body section at one end thereof, a driven journal located at the opposite end thereof, a drive end rotor plate, a drive end packing seal retainer, and a packing gland seal means, the improvement in the packing gland seal means which comprises: a bushing-like, visco sleeve assembly having a cylindrical inner surface being provided with an integral continuous, first peripheral annular ridge located proximal to the one longitudinal end of the sleeve assembly, which one end is distal from the helical profile body; a generally sleeve-shaped, metallic liner positioned adjacent the inner periphery ridge of the assembly; a sleeve-like, circular visco seal, being stepped-down intermediate the ends thereof, having first and second cylindrical peripheries, with the lesser diameter, periphery seal being located distal from the helical profile body section and with the larger diameter periphery seal being provided with a visco seal threading, and with the sleeve assembly and circular visco seal defining an annulus-type inner chamber there between; a single, rope-like first packing component positioned about the visco seal periphery and abutting the annular ridge of the sleeve subassembly; and the packing seal retainer being L-shaped and positioned adjacent the sleeve subassembly and also abutting and compressing laterally the first packing component.

BRIEF DESCRIPTION OF THE DRAWINGS

FIGS. 5A and 5B are side elevation, and end elevational, views, respectively, of the visco sleeve assembly bushing of the present invention, as employed on the present visco assembly of FIG. 4;

FIGS. 6A and 6B are side elevation and end elevation views, respectively, of the sleeve-like, circular sealing component of the present invention for the left hand rotor of FIG. 2;

FIGS. 7A and 7B are side elevation, and end elevation, views, respectively, of the packing seal of the present invention;

DETAILED DESCRIPTION OF THE PREFERRED EMBODIMENT

Figure 1:
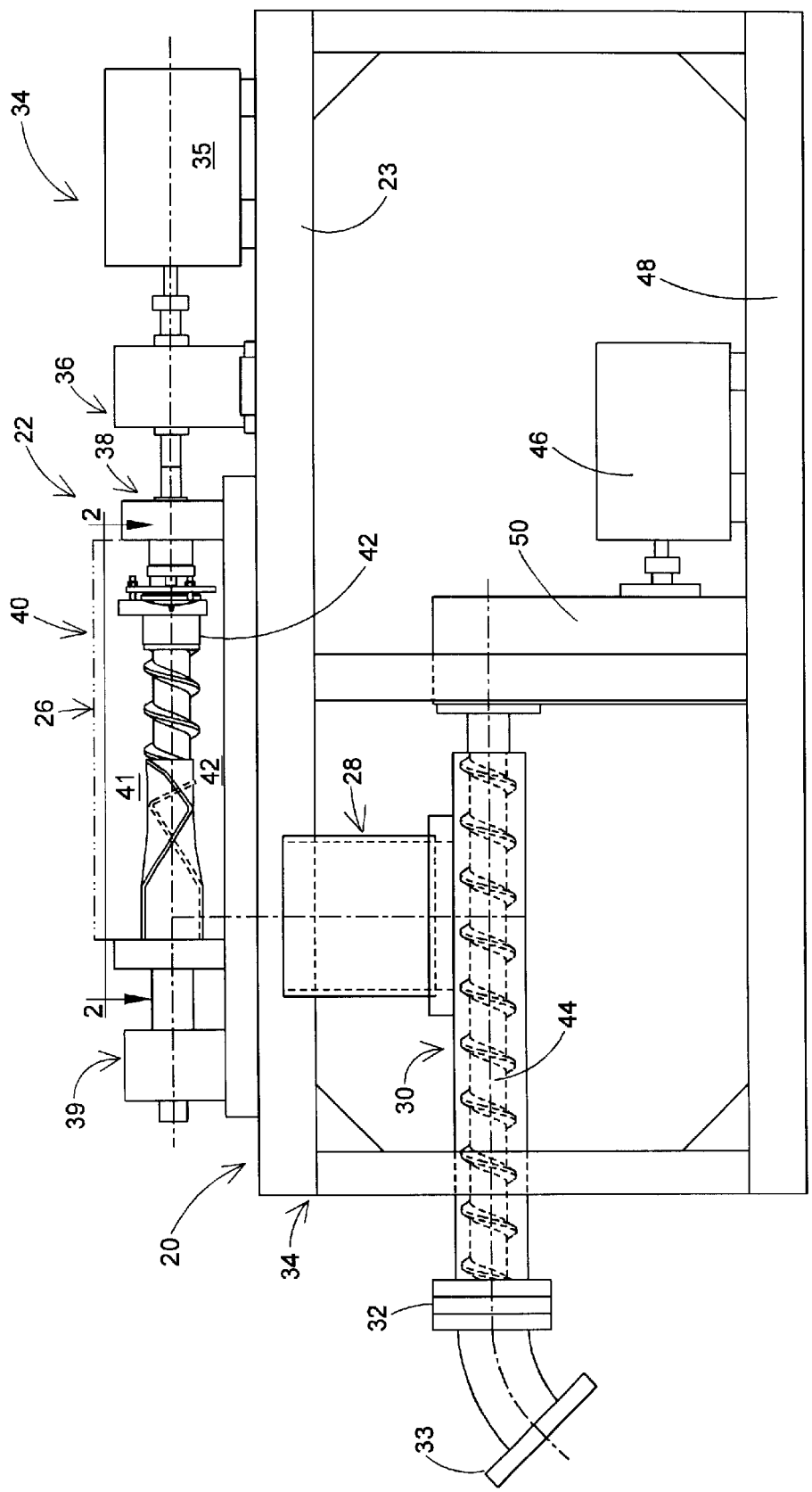
FIG. 1 is a side elevational view of a conventional compact processor for plastic particulate materials comprising a unitized particulate mixing and extrusion system, wherein particulate plastics are mixed, liquified and the resulting molten materials are pelletized for later molding into useful articles.

With reference to FIG. 1, there is shown a compact processor 20 for plastic materials and comprising a unitized mixing and extrusion system that allows a user to customize mixing and extrusion of plastic materials being processed. This unitized processor system comprises a two-rotor, continuous mixer 22 mounted on an upper level 23 of a framework 24. Plastic materials, fillers, additives, colorants, and the like, as desired by the user, namely various ingredients desired to be mixed with plastic materials, are introduced into a feed entrance (sometimes called a "feed throat") of the continuous mixer 22, as indicated by an arrow 26. The resulting molten plastic materials flow by gravity down from the continuous mixer 22 like a molten "rope", descending within a vertical chute 28, into a hot-feed extruder 30. The output from the extruder 30 issues through an extruder head 32 adapted to have various types of an extrusion device 33 mounted thereon, as may be desired by the user.

For driving the two rotors in the mixer 22, there is shown a suitable drive system 34, for example, such as a d.c. drive motor 35 arranged with suitable feedback speed and torque controls, as known in the art, for turning the mixer rotors preferably at predetermined constant speed. This motor 35 is coupled to a suitable speed-reducer 36, for example such as an all helical gear, speed-reducer with two output shafts coupled to two three-piece rotors for rotating the two rotors in opposite directions about their respective longitudinal axes. In this illustrative example, the two rotors are turned in opposite directions at the even/or ratio rates.

The mixer 22 includes a drive end frame 38 (also called a "drive bearing housing assembly") for rotatably supporting a drive end journal (not seen in FIG. 1). This drive end frame 38 and its journal will be described in detail later. The mixer includes a driven end frame 39 "which may be called the "water end frame" and also may be called "driven bearing housing assembly") for rotatably supporting a driven end journal (not seen in FIG. 1). The driven end, frame 39, and its journal, also will be described in detail later. Mounted between drive and driven end frames 38, 39 is a mixer chamber barrel, or housing 40, including an upper half 41 and a lower half 42.

For driving an extruder feed screw 44 (FIG. 1) in the hot-fed extruder 30, there is shown an electric motor 46 mounted on a base 48 of framework 24. This motor 46 is coupled through a suitable speed-reducer transmission 50 to the extruder screw 44.

Figure 2:
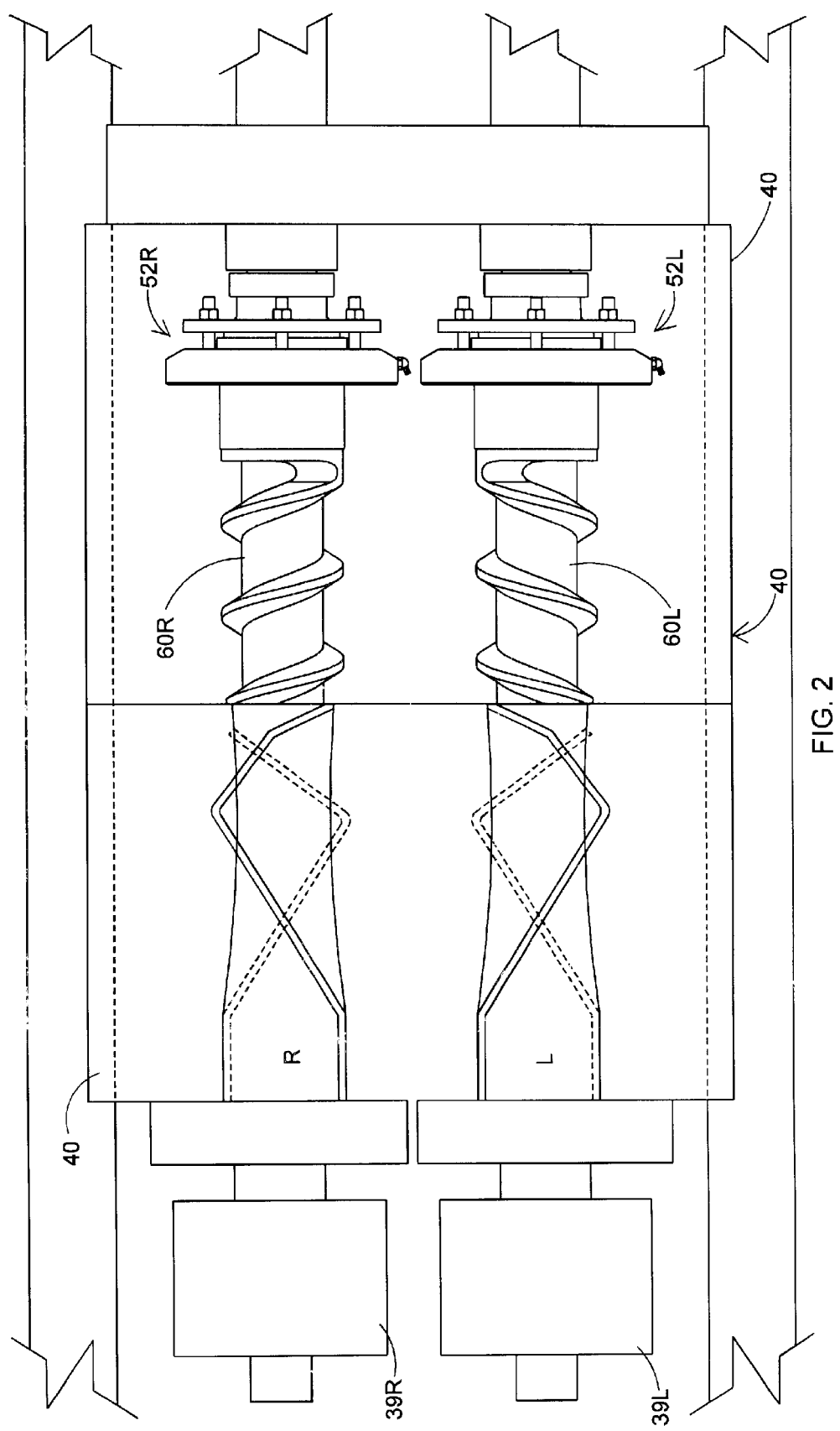
FIG. 2 is an enlarged, vertical view of the processor of FIG. 1, taken along lines 2—2 in FIG. 1, depicting a parallel set of material mixing assembly rotors, positioned within the compact processor of FIG. 1.

Looking to top plan view of FIG. 2, with upper barrel half 41 removed, there is shown a pair of parallel rotors, 60L/R, both positioned horizontally within housing 40, and which are denominated left and right hand mixing rotors, respectively. The left-hand, longitudinal ends of the mixing rotors are mounted conventionally in journals at the drive end, frame 38, while the drive ends each have a packing seal assembly, generally 52L/R, respectively, to be described, in connection with FIG. 4, et seq. The other longitudinal ends of the paired rotors are mounted in driven ends of the housing frames, 39L/R (FIG. 1).

Figure 3:
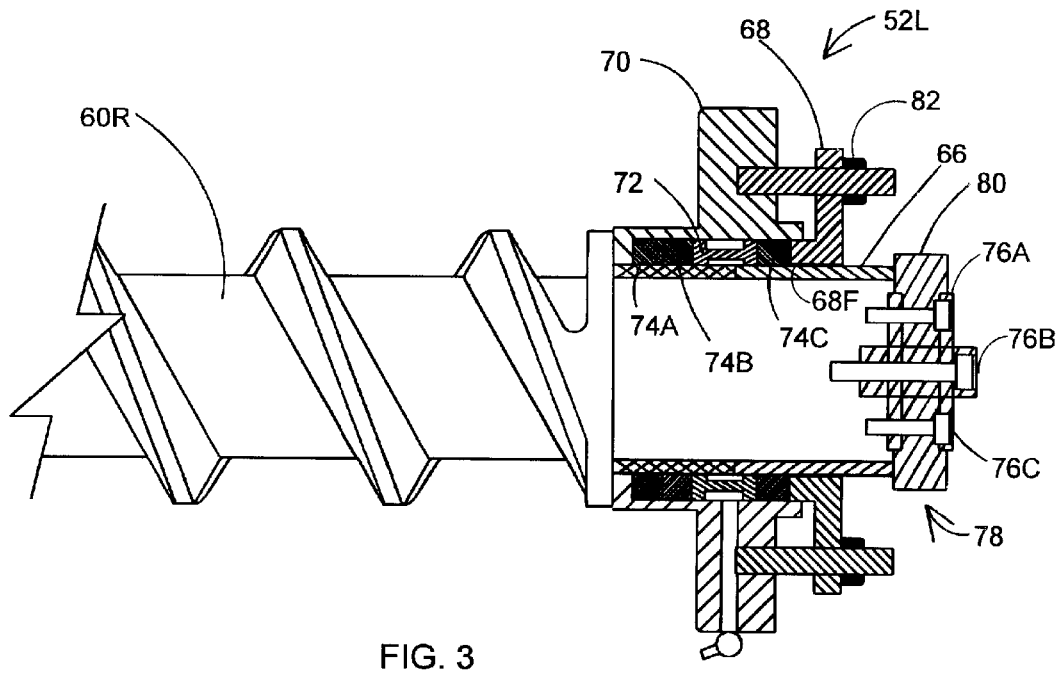
FIG. 3 is a broken away, enlarged vertical view of the drive and assembly of the mixing components of a processor of FIG. 1, wherein a drive end, prior art, packing gland seal configuration is depicted.

Reference will now be made to FIG. 3 to describe a state of the prior art device regarding drive end, packing seal assemblies, employable in connection with the compact processor for plastic materials, schematically seen in FIGS. 1 & 2. Axially mounted to the drive end 38 of right hand, helical rotor 60R is the drive end, packing seal assembly, generally 52R. It comprises: an inner, collar-like. wear sleeve 66; an L-shaped, packing seal retainer 68; a bushing-like, packing housing 70; and an alignment ring 72, which separates three rope-like, packing components, 74A, 74B, and 74C; the subassembly 78 at the free outer end comprises rotor plate 80; and associated bolts and washers, 76A, B, C which clamp that describes parts in a working relation; the horizontal flanged element 68F of seal retainer 68 is biased inwardly, via its lock nut 82 against the set of rope packings 74. These serve to expand same radially against the circular periphery of wear sleeve 66.

Experience has shown that the particulate material, while in process, infiltrates into the just-described sealing arrangement, thereby hardening this packing set, generally 74A/74B. This progresses to the extent that they will not properly seal against wear sleeve 66. This time developing defect causes feed particulate to leak about the wearing sleeve 66 periphery. When the leakage contamination levels reach appreciable levels, the mixer must be shut down, and all the just-described packing seal elements are disassembled, so as to permit replacement of the three rope packing rings, the intermediate alignment ring and the wear sleeve.

Figure 4:
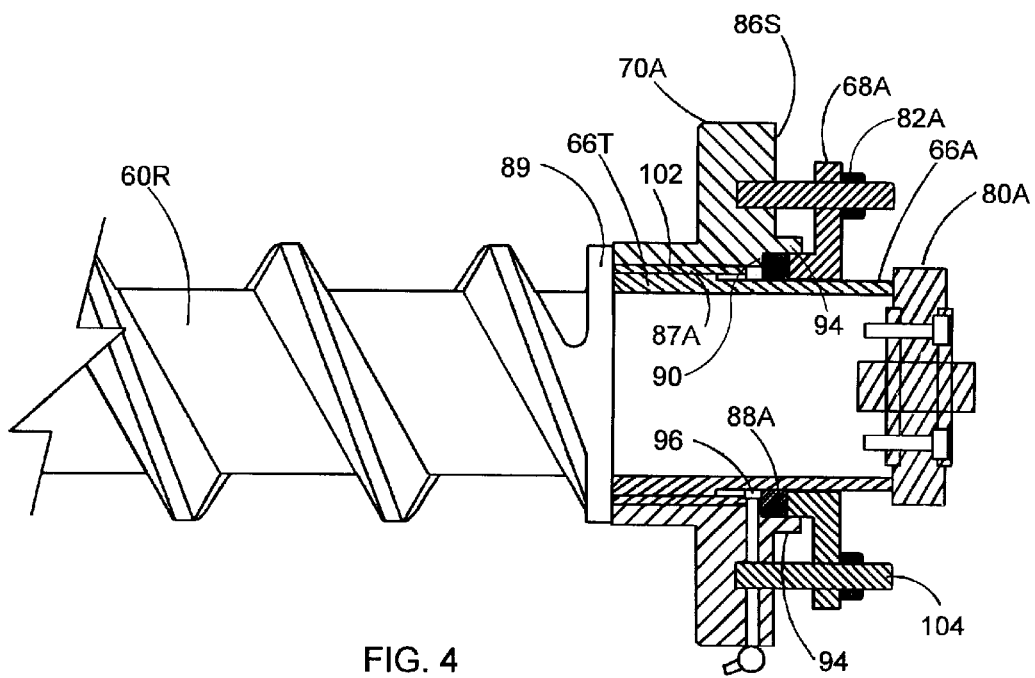
FIG. 4 is another broken out, enlarged vertical sectional view of the drive end, packing gland seal means configuration but now of the present invention.

Looking now to the vertical sectional view of FIG. 4, a structurally modified and improved visco sealing assembly of the present invention is depicted. Several of the components are continued modified, such as the rotor plate 80A, and the seal retainer 68A, but the alignment ring 72 is now omitted. The sleeve assembly 70A, the wear sleeve 66A, and the packing component 88A themselves, are significantly reconfigured for superior visco sealing. Sleeve assembly 70A is now provided along its inner circumferential surface with an integral, continuous peripheral ridge 90, which ridge is located quite proximal to the longitudinal end, of sleeve assembly sidewall 86S, and is distal from the adjoining right hand, rotor 60R/L flanged end 89. A second circular, axially projecting ridge 94 is provided upon the sleeve assembly sidewall 86S, and is contiguous (conjoined) with the inner peripheral ridge 90 thereof.

An annular chamber 96 of squared cross section, is defined by bushing-like, sleeve assembly 70A; ridge 94; ridge 90, wear sleeve 66A, and packing seal retainer 68A. These elements provide the functional recess for a single rope packing component, 88A. Offset, but linearly aligned with chamber 96, is the annular chamber 87A of an elongate rectangular cross section defined by the opposing circumferential periphery of sleeve assembly 70A and drive end visco seal wear sleeve 66A. This annulus-shaped recess 87A accommodates the metal liner 102 of the present invention, which liner demonstrates prolonged effectiveness during mixing and extrusion. The novel heat resistant, liner 102 of the present invention is preferably composed of bronze.

The side and end elevational view of FIGS. 5A/B, depict the dimensions of the somewhat modified bushing-like, sleeve assembly 70A with sleeve 102 in place; while the side and end elevation views of FIGS. 6A/B depict the right hand, visco wear sleeve seal 66A. Note that the inwardly oriented, circular ridge 90 on bushing 70A provides lateral support to the inward edge of sleeve liner 102. The sleeve seal 66A has a peripherally threaded segment (66T) proximal to the one longitudinal end. This latter sleeve component is known in the art as a standard element for visco seals, which was described in expired U.S. Pat. No. 3,963,247, of Jun. 15, 1976 to Nommensen.

In the end elevational view and side elevational view of FIGS. 7A and 7B, the circular, ring-like, configuration resilient of packing 88A is depicted.

Figure 8:
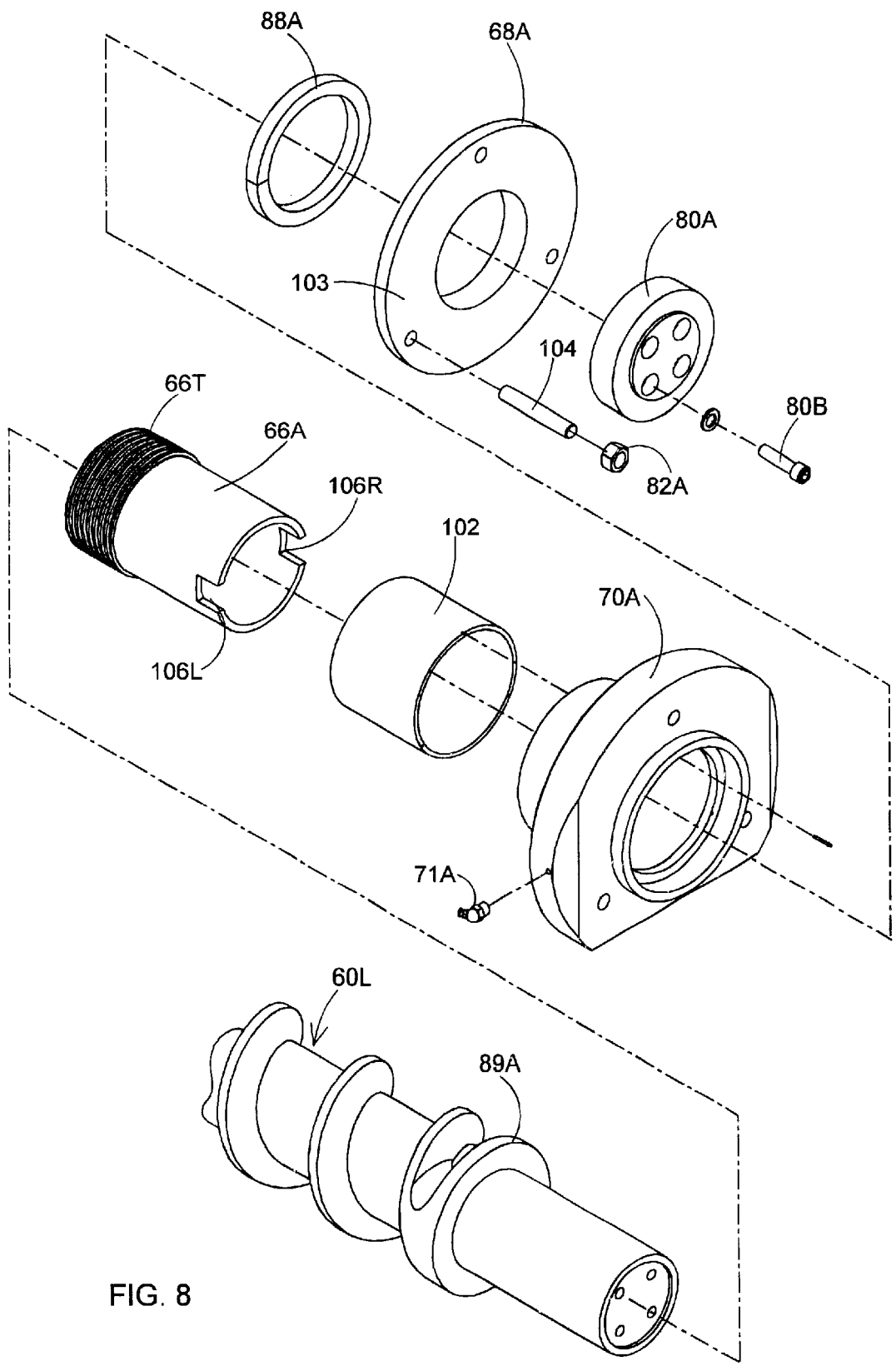
FIG. 8 is an exploded perspective view, illustrating the several components, both standard and novel, which comprises the improved drive end, visco seal assembly of the present invention.

Looking now to the exploded perspective view of FIG. 8, which depicts all of the operative components aligned pre-assembly, opposing lower edge, 103, of seal retainer 68A, has a set screw 104, which screw serves to retain packing 88A in abutting relationship with inward oriented, circular ridge 90 of sleeve assembly 70A with grease fitting 71A.

Two diametrically opposed, squared notches, 106L/R, are provided in the circular rim 106 of drive end visco sleeve 66A which extends outwardly of the one longitudinal end. These serve to key the alignment of the sealing component within the drive end subassembly 52L (right hand rotor shown) of FIG. 2.

Selected spaced-apart sealing elements, to wit, L-shaped seal retainer 68A, bushing-like sleeve assembly 70A, dual circumference, visco seal 66A, and rope packing 88A, comprise the modified elements of the drive end, improved visco seal means of the present invention.

What is claimed is:

1. In a continuous mixer apparatus adapted for commingling of particulate thermoplastic materials of varying polymeric compositions, and having a mixer barrel, at least one main rotor with a helical profile body section at one end thereof, a driven journal located at an opposite drive end thereof, a drive end rotor plate, a drive end packing seal retainer, and a packing gland seal means at the drive end, the improvement in the packing gland seal means which comprises:

(a) a bushing-like, visco sleeve assembly having a cylindrical inner surface being provided with an integral continuous, first peripheral annular ridge located proximal to one longitudinal end of the sleeve assembly, which one end is distal from the helical profile body;

(b) a generally sleeve-shaped, metallic liner positioned adjacent the inner periphery of the sleeve assembly;

(c) a sleeve-like, circular visco seal, being stepped-down intermediate the ends thereof having first and second cylindrical peripheries, with the lesser diameter, periphery seal being located distal from the helical profile body section, and with the larger diameter periphery seal being provided with a visco seal threading, and with the sleeve assembly and circular visco seal defining an annulus-type inner chamber therebetween;

(d) a single, rope-like first packing component positioned about the visco seal periphery and abutting the annular ridge of the sleeve assembly; and (e) said packing seal retainer being L-shaped and positioned adjacent the sleeve assembly and also abutting and compressing laterally the first packing component.

2. The gland seal means of claim 1 wherein, as to the visco sleeve assembly, a second peripheral circular ridge is located upon a sidewall thereof and is contiguous with the first peripheral annular ridge, serving to maintain alignment between the first packing component and the visco sleeve assembly.

3. The gland seal means of claim 1 wherein said first packing component, has a substantially square cross-section while in an undeformed configuration.

4. The gland seal means of claim 1 wherein said metallic liner has a substantially circular cross section.

5. The gland seal means of claim 1 wherein, said circular visco seal has a chamfer provided at the circular rim thereof proximal to the main rotor.

6. The gland seal means of claim 1 wherein said circular visco seal has a pair of diametrically opposing notches are provided in the circular rim thereof, which is distal from the main rotor; and which maintain a static position relative to the rotor.

7. The seal gland means of claim 1 wherein the metallic liner comprises bronze metal.

* * * * *